Dec. 8, 1959  G. R. KAUTZ ET AL  2,916,644
CATHODE RAY TUBE
Filed Nov. 7, 1956  2 Sheets-Sheet 1

INVENTORS
GEORGE R. KAUTZ
ALAN T. KURYLA
HARRY E. SMITHGALL
BY
Robert E. Isrammen
ATTORNEY Dec. 8, 1959  G. R. KAUTZ ET AL  2,916,644
CATHODE RAY TUBE
Filed Nov. 7, 1956  2 Sheets-Sheet 2

INVENTORS
GEORGE R. KAUTZ
ALAN T. KURYLA
HARRY E. SMITHGALL
BY
ATTORNEY

United States Patent Office 2,916,644
Patented Dec. 8, 1959

2,916,644

CATHODE RAY TUBE

George R. Kautz, Seneca Falls, Alan T. Kuryla, Geneva, and Harry E. Smithgall, Seneca Falls, N.Y., assignors, by mesne assignments, to Sylvania Electric Products Inc., Wilmington, Del., a corporation of Delaware Application November 7, 1956, Serial No. 620,884

2 Claims. (Cl. 313—85)

This invention relates to image display devices such as cathode ray tubes and more particularly to face panel assemblies employed in these devices.

Cathode ray tubes adapted for use in color television apparatus generally have a glass face plate upon which an image display screen is formed. This screen comprises patterns of blue, green and red fluorescent materials which are excited upon impingement of appropriately energized electron beams. The patterns usually consist of a large number of phosphor dots, stripes, or bars.

Since a high degree of accuracy is required in the formation of image display patterns, a photographic printing operation is normally used. In this process, the fluorescent materials, which have been combined with a light sensitive substance, are exposed to light rays through a negative having the proper configuration. During this exposure operation, the face panel is uniquely placed upon the top of an exposure device frame so that the light source is correctly spaced from fluorescent material coating and appropriately positioned relative to the panel.

Numerous structures have been proposed for the purpose of properly aligning and positioning the face panel upon the exposure device. One such structure utilizes a panel with glass buttons or nubbins formed to cooperate with referencing legs on the exposure device. This approach has not proved satisfactory because of the difficulty of controlling the accuracy in replacement of the mask to the identical position for each of the three successive exposure operations needed to completely fabricate the screen. In addition, the provision of glass nubbins is expensive and the envelop fabrication problems are increased.

Accordingly, an object of the invention is the provision of an improved cathode ray tube.

A further object is the provision of an improved assembly for a cathode ray tube.

Another object is the provision of a face panel assembly adapted to cooperate with the exposure device used in the screen forming process.

The foregoing objects are achieved in one aspect of the invention by the provision of a face panel having spaced tabs connected to the flange of the face plate. These tabs have apertures formed therein for cooperation with referencing means on the exposure device. In one aspect of the invention, the tabs are also used to align the face panel with the cone of the tube and with the electron shield.

For a better understanding of the invention, reference is made to the following description taken in conjunction with the accompanying drawings in which.

Figure 1:
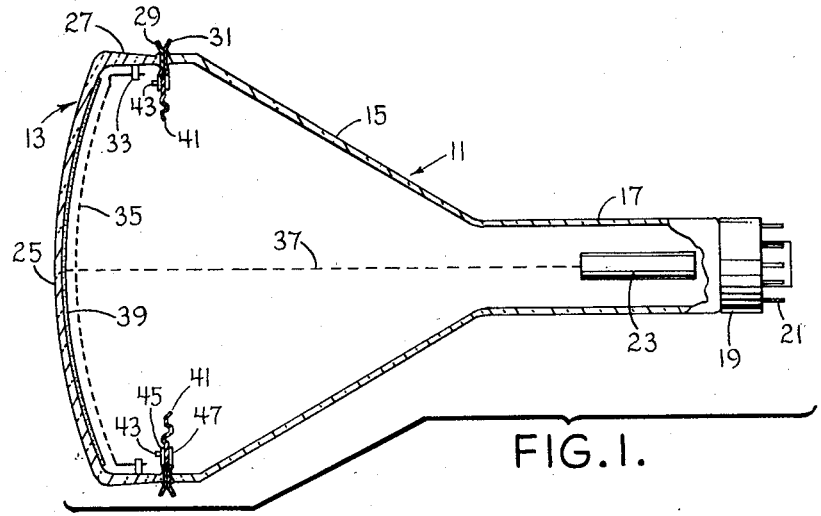
Fig. 1 is a sectional view of a cathode ray tube.

Referring to Fig. 1, a cathode ray tube 11 is shown comprising a face panel assembly 13, cone 15 and a neck portion 17 which terminates with a base 19. Connector pins 21 are mounted upon the base to provide the electrical interconnections between the television receiver circuitry and the electrodes of the electron gun or guns 23. Face panel assembly 13 has a glass viewing plate 25 and an integral peripheral wall portion 27. This wall portion may be made of either metal or glass. Assembly 13 is hermetically sealed to cone 15 by means of a solder or weld connection between peripheral metal flange 29 and rim 31. This flange is positioned substantially normal to wall 27. Mounted upon face panel assembly 13 by means of lugs 33 is an apertured grid or mask 35. The electron stream or streams 37 emitted from electron gun or guns 23 is caused to pass through the apertures in mask 35 and impinge upon the luminescent screen 39 formed upon the internal surface of face plate 25. Tubes employing a wall portion 27 made of glass utilize an electron shield 41 which is held between flange 29 and rim 31 by means of pins 43. These pins are threaded through apertures formed in tabs 45 and protrusions 47, which are attached to flange 29 and rim 31 respectively. The shield 41 serves to prevent electrons from striking the glass at wide deflection angles.

The luminescent screen 39 for a color cathode ray tube is usually formed by a photographic printing operation. In this process, a photosensitive substance such as polyvinyl alcohol sensitized with ammonium dichromate and one of the phosphors such as the blue phosphor, are first deposited on the viewing plate 25. Mask 35 is then attached to panel 13, and the assembly is positioned upon a light exposure device such as the one indicated in Fig. 2 by the numeral 49. A light source 51, which is positioned within frame 53 of exposure device 49, is energized to expose the photosensitive substance and phosphor to light rays 54 through mask 35. After exposure, panel 13 is removed from device 49 and dis-assembled from mask 35. The pattern is subsequently developed by washing the screen materials with deionized water. The exposed portions of the screen are hardened by the action of the light and therefore remain on the panel while the unexposed portions are removed by the developing fluid. This process is subsequently repeated with the green and red phosphors to complete the tri-color phosphor screen. For each of the three exposure operations, the light source 51 is offset from assembly 13 in a prescribed manner. In practice, this is accomplished by rotating light source 51, which is offset from the longitudinal axis of panel 13, through approximately 120° for each exposure. Therefore, it is apparent that panel 13 must be repetitiously placed at the same position on frame 53 for each exposure operation. If proper panel alignment relative to light source 51 is not achieved, the exposed areas of the different phosphors will overlap and cause a screen to be produced which will be unacceptable for reasons of poor color reproduction.

Figure 2:
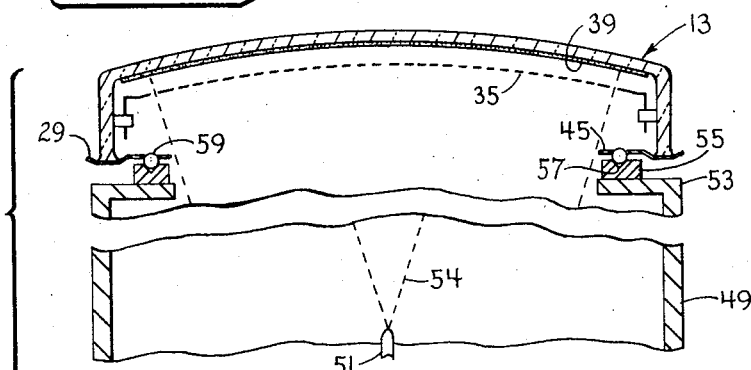
Fig. 2 is a sectional view of a cathode ray tube face panel positioned upon a light exposure device.
Figure 5:
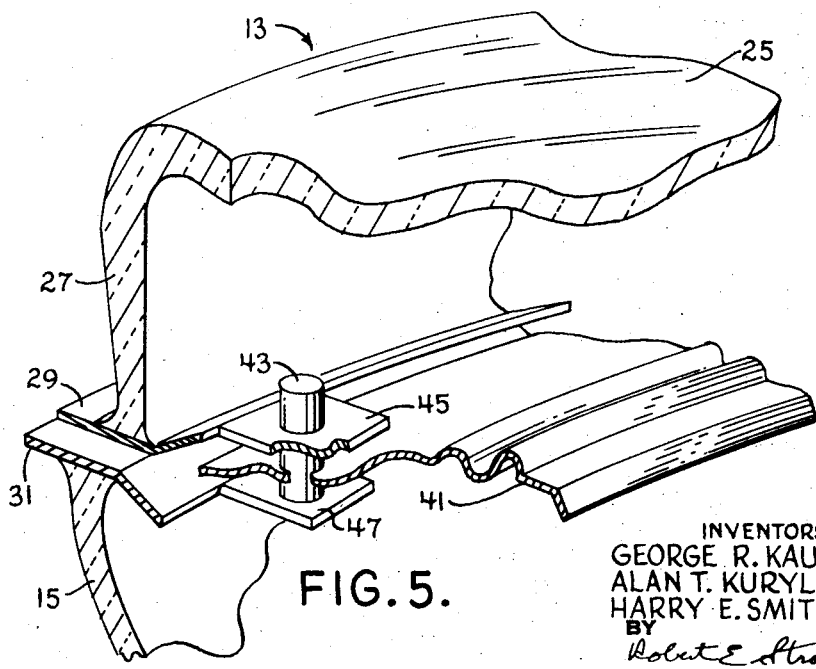
Fig. 5 is an enlarged perspective view of a portion of a cathode ray tube.

Mounted upon the top of light exposure device frame 53 are several pedestals 55, which are formed with substantially V-shaped grooves 57. An aligning device such as a sphere 59 is positioned in grooves 57 to provide aligning means between exposure unit 49 and viewing plate 25 during the exposure operation. Apertures formed in tabs 45 cooperate with spheres 59 to provide the unique positioning desired. In one embodiment of the invention, tabs 45 are welded or otherwise attached to flange 29 to extend inwardly therefrom in the manner which is shown in Figs. 2 and 5. Preferably, three pedestals are mounted upon frame 53 and three cooperating tabs 45 are welded to flange 29 at non-symmetrically arranged positions.

The provision of a structure of this type assures unique positioning of viewing plate 25 with respect to light source 51 since the apertures in the tabs will cooperate with spheres 59 only when properly oriented.

Figure 3:
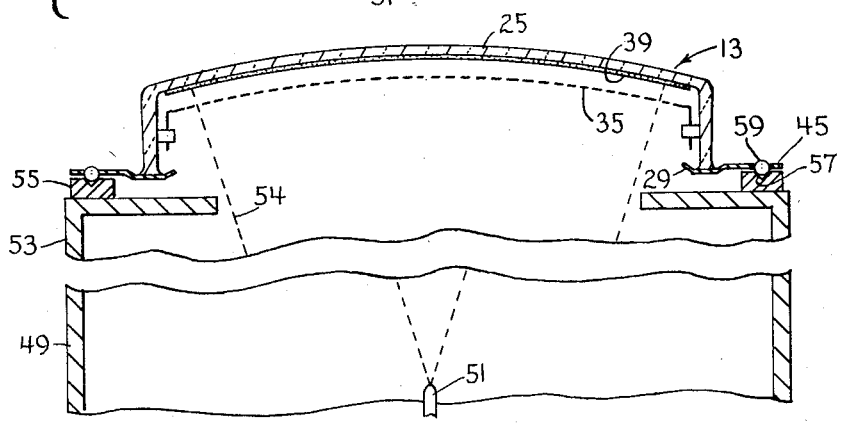
Fig. 3 is a view similar to Fig. 2 showing a modified face panel assembly.
Figure 4:
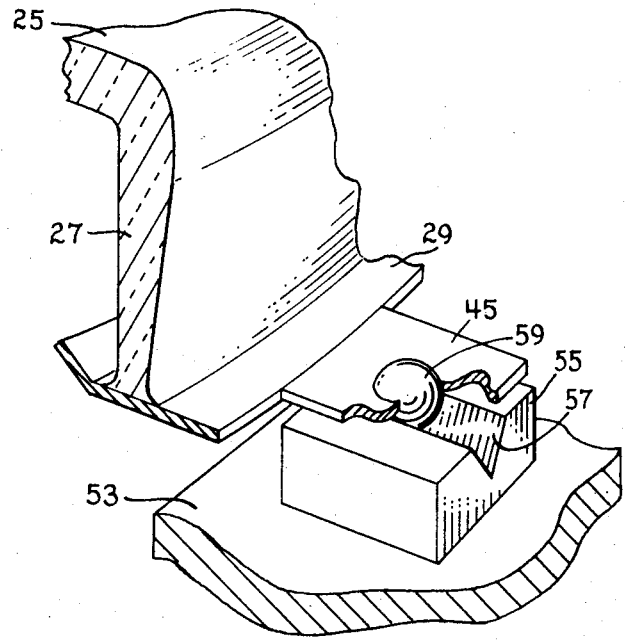
Fig. 4 is an enlarged perspective view showing the referencing structures formed to align the face panel assembly with the exposure device.

Figs. 3 and 4 illustrate another aspect of the invention wherein tabs 45 are welded or otherwise attached to extend outwardly from flange 29. In this instance, pedestals 55 and spheres 59 are positioned on frame 53 so as to cooperate with the apertures in tabs 45.

Referring to Fig. 5, the utilization of internally extending tabs 45 additionally provides means for aligning face panel assembly 13, shield 41 and cone 15 with one another in the finished cathode ray tube. During assembly of these components, shield 41 may be placed intermediate flange 29 and rim 31 so as to have the apertures formed in tabs 45, protrusions 47, and shield 41 in alignment with one another. The pin 43 may then be inserted through these apertures to hold the parts during the sealing operation. If desired, pin 43 may be permanently attached to protrusions 47 so that shield 41 and face panel assembly 13 may be stacked upon them.

Cathode ray tube structures formed in accordance with the invention enhance efficient and accurate formation of the screen patterns and provide ease and exactness of component assembly.

Although several embodiments of the invention have been shown and described, it will be apparent to those skilled in the art that various changes and modifications may be made therein without departing from the scope of the invention as defined by the appended claims.

What is claimed is:

1. A cathode ray tube assembly comprising a face panel having a glass viewing plate with a wall portion extending therefrom, a peripheral metal flange hermetically attached in a substantially normal position to said wall portion, and three spaced tabs each having an aperture therein mounted upon said flange to extend inwardly therefrom, in combination with a cone terminating in a peripheral metal rim formed to abut and be hermetically sealed to said flange, said rim having three spaced protrusions each having an aperture formed therein mounted to extend inwardly therefrom and positioned to provide alignment of the apertures in said tabs with the apertures in said protrusions, an electron shield positioned intermediate said tabs and protrusions having three apertures therein aligned with the apertures of said tabs and said protrusions, and three pins extending through the aligned apertures to maintain positioning of said shield relative to said face panel and said cone.

2. A cathode ray tube assembly comprising a face panel having a glass viewing plate with a wall portion extending therefrom, a peripheral metal flange hermetically attached in a substantially normal position to said wall portion, and three spaced tabs each having an aperture therein mounted upon said flange to extend inwardly therefrom, in combination with a cone terminating in a peripheral metal rim formed to abut and be hermetically sealed to said flange, said rim having three spaced protrusions nonsymmetrically positioned about the rim, each having an aperture formed therein mounted to extend inwardly therefrom and positioned to provide alignment of the apertures in said tabs with the apertures in said protrusions, an electron shield positioned intermediate said tabs and protrusions having three apertures therein aligned with the apertures of said tabs and said protrusions, and three pins extending through the aligned apertures to maintain positioning of said shield relative to said face panel and said cone.

References Cited in the file of this patent

UNITED STATES PATENTS

| | | |
|---|---|---|
| Re. 23,735 | Olson | Nov. 10, 1953 |
| 2,690,518 | Fyler | Sept. 28, 1954 |
| 2,727,172 | Mark et al. | Dec. 13, 1955 |
| 2,733,366 | Grimm et al. | Jan. 31, 1956 |
| 2,793,319 | Nunan | May 21, 1957 |
| 2,817,276 | Epstein et al. | Dec. 24, 1957 |
| 2,827,584 | Olson | Mar. 18, 1958 |
| 2,856,552 | Evans | Oct. 14, 1958 |